Figure 1:
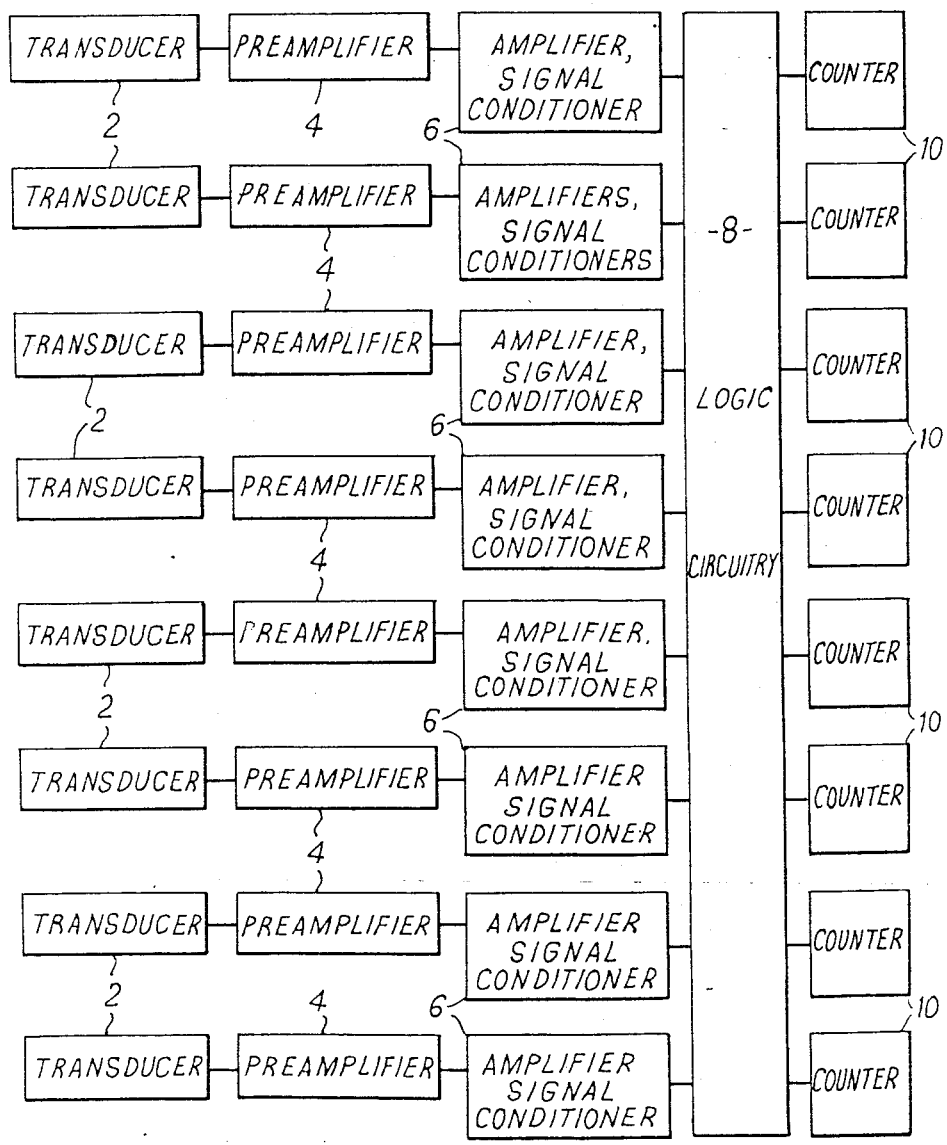

United States Patent
Pollock

[11] 3,822,586
[45] July 9, 1974

[54] ELECTRICAL CIRCUIT MEANS FOR USE IN ACOUSTIC EMISSION DETECTING AND/OR RECORDING APPARATUS

[76] Inventor: Adrian Anthony Pollock, Bar Hill, Cambridge, England

[22] Filed: Aug. 1, 1972

[21] Appl. No.: 276,955

[52] U.S. Cl. .............................................. 73/71.4
[51] Int. Cl. ........................................... G01h 1/00
[58] Field of Search ......... 73/67, 69, 71.4; 340/6 R, 340/16 R

[56] References Cited
UNITED STATES PATENTS

| | | | |
|---|---|---|---|
| 2,427,569 | 9/1947 | Nicolson | 340/6 R X |
| 2,499,605 | 3/1950 | Nicolson | 340/6 R X |
| 3,490,024 | 1/1970 | Sherril et al. | 343/3 C UX |
| 3,713,127 | 1/1973 | Keledy et al. | 73/67 X |

FOREIGN PATENTS OR APPLICATIONS 1,407,160   6/1965   France .................................. 73/67

OTHER PUBLICATIONS

P. H. Hutton, Acoustic Emission in Metals as an NDT Tool, Materials Evaluation, July 1968, p. 125–129.

*Primary Examiner*—Richard C. Queisser
*Assistant Examiner*—John P. Beauchamp
*Attorney, Agent, or Firm*—Browdy & Neimark

[57] ABSTRACT

Electrical circuit means for use in acoustic emission detecting and/or recording apparatus comprises logic gates which in operation of the apparatus are connected to respective transducers so as to receive electrical signals representative in time of the distances of the transducers from a source of acoustic emission. Each gate is set prior to the receipt of a signal from the associated transducer to afford an output signal on receipt of a signal at its input. Further logic elements are provided which are connected with the logic gates and are adapted upon receipt by one of the gates by an input signal to reset for a predetermined time at least the remainder of the logic gates so as to prevent the appearance of an output signal on any of said remainder of the logic gates at said predetermined time.

9 Claims, 6 Drawing Figures

ELECTRICAL CIRCUIT MEANS FOR USE IN ACOUSTIC EMISSION DETECTING AND/OR RECORDING APPARATUS

This invention relates to electrical circuit means for use in acoustic emission detecting and/or recording apparatus.

Hitherto it has been found that active growth of cracks and flaws and plastic deformation in stressed structures, e.g. pressure vessels, leads to the generation of stress waves known as acoustic emissions which radiate from the source of deformation and may be detected by remote transducers and associated channels of signal processing equipment and moreover it has been found that the remote transducers detect the stress waves after time intervals which depend on their proximity to the source of deformation. Furthermore, it has been found that by analysis of the time intervals between arrival of the stress wave at several transducers it is possible to infer the location of the source of the stress wave.

When signals from a number of transducers are all recorded on a medium such as a multi-channel tape recorder, much of the information may be redundant and the recording of the same emission on many channels may obscure rather than facilitate the interpretation of the data. It is desirable to remove such redundant information and through the association of each emission with only one transducer identify the region of source location without complex processing of time interval data.

It is accordingly an object of the present invention to provide electrical circuit means for use in acoustic emission detecting and/or recording apparatus which enables such apparatus to obtain in improved manner a measure of acoustic emission source location.

The present invention consists of an electrical circuit means for use in acoustic emission detecting and/or recording apparatus having a plurality of channels and transducers for detecting acoustic emissions from a source in a structure. The circuit means includes a signal conditioner means for converting analogue signals, representative of acoustic emissions received by a transducer, to digital form. The acoustic emissions travel through the structure at the speed of sound so that the nearer a transducer is located to the source the sooner will it receive the emissions. A plurality of logic gates, each having a first and second input connection and an output connection, are connected by the first input connection in a channel of the apparatus to a transducer by way of the signal conditioner means. The logic gate in each channel of the apparatus is set prior to receipt of a signal from the associated signal conditioner means to afford at its output connection an output signal upon receipt of said signal at the first input connection. Logic elements means are connected between the output and the second input connections of each of the logic gates for resetting, upon receipt of a digital signal by one of said logic gates at the first input connection thereof, the remainder of the logic gates to prevent the appearance of an output signal at any of the remainder of logic gates for a predetermined time which is short compared with the time interval between successive acoustic emissions from the source.

Suitably, the further logic elements are adapted upon receipt at its input of a signal by one of the logic gates to reset for a predetermined time all the logic gates so as to prevent the appearance of an output signal on any of the logic gates during said predetermined time.

Alternatively, the further logic elements are adapted upon receipt at its input of a signal by one of the logic gates to reset for a predetermined time so as to prevent the appearance of an output thereon only those logic gates other than that in receipt of the input signal.

Figure 2:
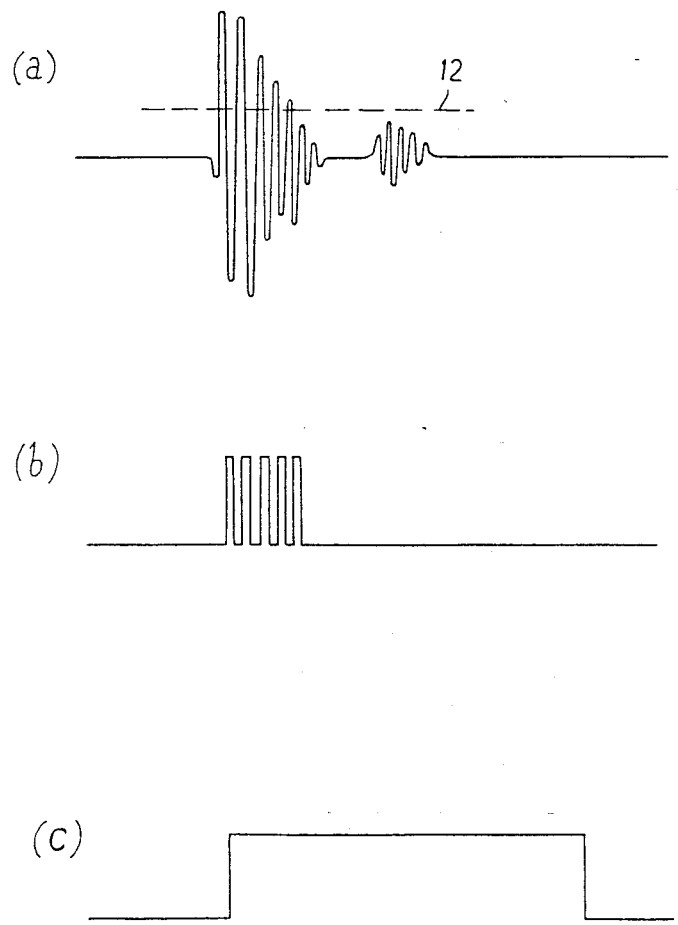

The invention will now be described, by way of example with reference to the accompanying drawings, in which:

FIG. 1 is a block diagram of acoustic emission detecting and/or recording apparatus incorporating the invention, FIG. 2 (a) to (c) illustrate voltage against time wave forms at different locations of the apparatus of FIG. 1, and FIGS. 3 to 6 illustrate different embodiments of logic circuit means employed in accordance with the invention in the apparatus of FIG. 1.

Throughout the drawings like parts have been accorded the same reference numerals.

Referring first to FIG. 1 acoustic emission detecting and/or recording apparatus comprises eight transducers 2 connected via respective pre-amplifiers 4 to respective amplifiers and signal conditioners 6 which by way of logic circuit means 8 are connected to counters 10 there being one counter per channel. Whilst the arrangement of FIG. 1 illustrates eight transducers the number of transducers will depend on the installation and typically may well vary between four and 50. The transducers themselves are conventional accelerometers having a resonant frequency in the region of 150 KHz and they are placed in an array covering the structure under test. The pre-amplifiers 4 have a gain of 40 db and a bandwidth of 100–200 KHz. The output wave form of the pre-amplifiers 4 after further amplification as hereinafter described is shown at FIG. 2 (a) and shows the form of acoustic emission to be a "ring-down" wave form, i.e. a wave form comprising sets of decaying sinusoids.

The amplifiers and signal conditioners 6 each comprise an amplifier stage having a gain of 50 db, a filter stage having a narrow pass band centred at about 150 KHz, and a detector stage having a variable threshold indicated at 12 in FIG. (a). When the signal output from any particular pre-amplifier 4 after further amplification in the amplifier stage of conditioner 6 exceeds the threshold 12, a short train of digital output pulses as shown in FIG. 2 (b) is passed from the amplifier and signal conditioner 6 to the logic circuit means 8. If permitted as hereinafter described by the logic circuit means a signal is then transmitted to the counter 10 corresponding with the pre-amplifier whose signal output exceeded the threshold 12.

Instead of the counters 10, other forms of detecting and/or recording medium may be employed such as multi-channel recorders, computer systems, other data logging systems and so forth.

FIGS. 3 to 6 which illustrate different realisations of the logic circuit means will now be described. These circuits employ circuit elements in the form of AND gates, OR gates monostables and inverters which are operated by square voltage pulses the low voltage level of which is hereinafter called "logic level 0" whilst the high voltage level of the pulses is hereinafter referred to as "logic level 1".

An AND gate has the property that if logic level 1 is applied to each of its inputs, logic level 1 appears at the output. An OR gate has the property that if logic level 1 exists at any of its inputs, logic level 1 appears at its output. A monostable is a flip-flop device which responds when logic level 1 is applied to its input by providing a pulse of logic level 1 of fixed duration at its output. A retriggerable monostable is one in which the timing of the firing pulse is initiated by an input pulse irrespective of whether the input pulse arrives before or during a firing pulse. An inverter is a device which when either of logic levels 0 and 1 is applied at its input gives the other logic level at its output.

Figure 3:
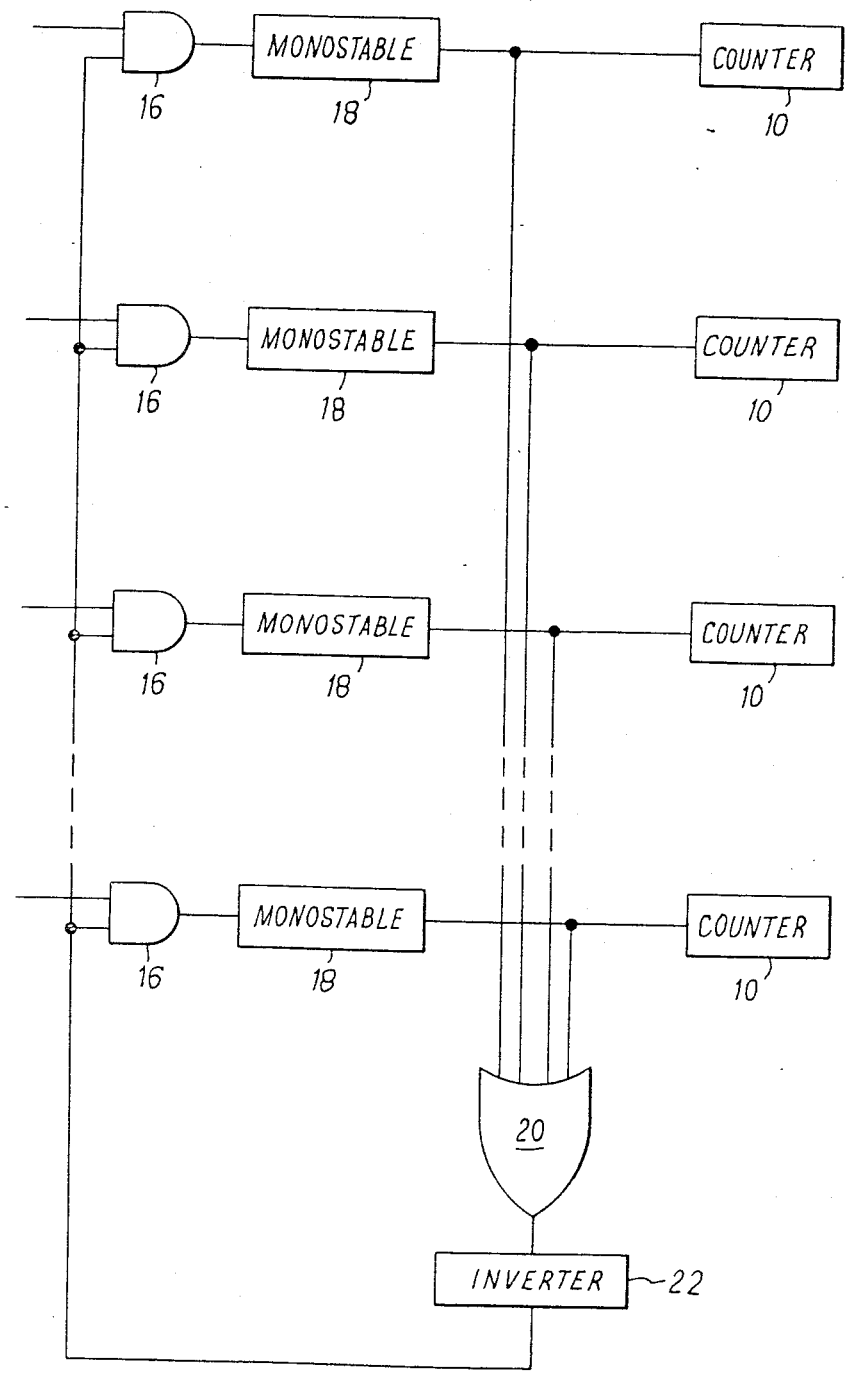

Referring now first to FIG. 3, eight AND gates 16, four only of which are shown in order to keep the diagram simple, each have a first input connected to the output of a signal conditioner 6 and an output connected to the input of a monostable 18. The outputs of the monostables 18 are connected to respective iputs of an OR gate 20 and to the different counters 10. The output of OR gate 20 is connected to the input of inverter 22 whose output connects to each of second inputs of the AND gates 16.

In operation of the logic circuit means of FIG. 3, in the quiescent state logic level 0 exists at the first inputs of the AND gates and at the input of the OR gate 20. Thus logic level 0 exists at the OR gate output and the inverter 22 thus provides logic level 1 at the second input of each AND gate 16. As soon as a signal, i.e. logic level 1 appears at the input of one of the AND gates, say for example the uppermost gate 16 in the drawing, the associated monostable is triggered to give a pulse of long duration, e.g. 1–100 milliseconds, as shown in FIG. 2(c), compared with the short duration pulses, e.g. 3 microseconds, of the associated signal conditioner output as depicted in FIG. 2 (b). The triggering of the monostable gives logic level 1 at an input of OR gate 20 and therefore at the output thereof with the result that the inverter 22 causes logic level 0 to be applied to the second inputs of all the AND gates 16 which thus prevent a signal of logic level 1 at the first inputs thereof from triggering the monostables 18 so far not triggered i.e. the three lowermost monostables 18 in the drawing. However the pulse at the output of the uppermost monostable 18 caused by the triggering thereof causes actuation of the associated counter 10, and endures, until the particular acoustic emission has ceased i.e. the sequence of acoustic emission signals from a particular acoustic emission arriving at transducers 2 has ceased. At the end of the pulse at the output of the uppermost monostable 18 the OR gate output returns to logic level 0 and the inverter output is thus restored to logic level 1. The circuit is thus in its quiescent condition awaiting the next signal of logic level 1 at one of the AND gate first inputs which arises when the next acoustic emission occurs.

Figure 4:
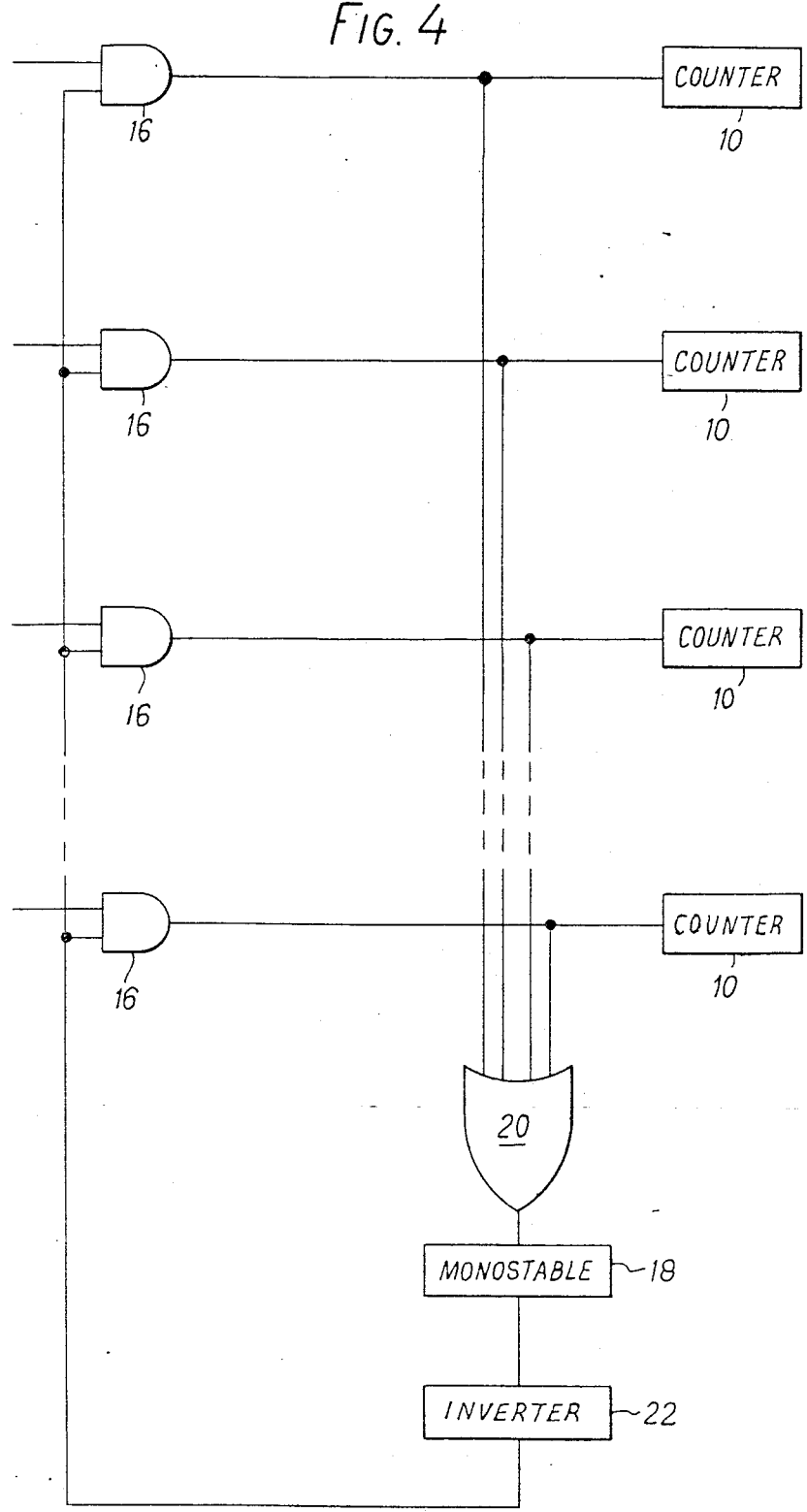

In FIG. 4 a single monostable 18 is used instead of monostables respectively connected to the AND gates. In the quiescent state logic level 0 prevails at the first inputs of the AND gates, at the outputs thereof, at the OR gate input and therefore at the input of inverter 22. The second inputs of the AND gates are therefore at logic level 1. As soon as the logic level changes to 1 at the first input of one, say the uppermost of the AND gates 16, logic level 1 appears at the output of that gate and actuates the associated counter 10. The OR gate is also actuated and causes the monostable 18 to be triggered so that for the period of the monostable pulse the second inputs of the AND gates, because of actuation of the inverter 22 by the monostable pulse, are at logic level 0 to prevent changes to logic level 1 on the inputs of the gates 16 changing the level of the output of the gates 16 which would actuate the associated counters 10. It will be appreciated that although in this arrangement fewer monostables 18 are used and ready adjustment of the monostable time constant is facilitated, there is the disadvantage that the counter has to respond to a pulse of very short duration in view of the AND gates being disabled on triggering of the monostable 18 and inverter 22.

Figure 5:
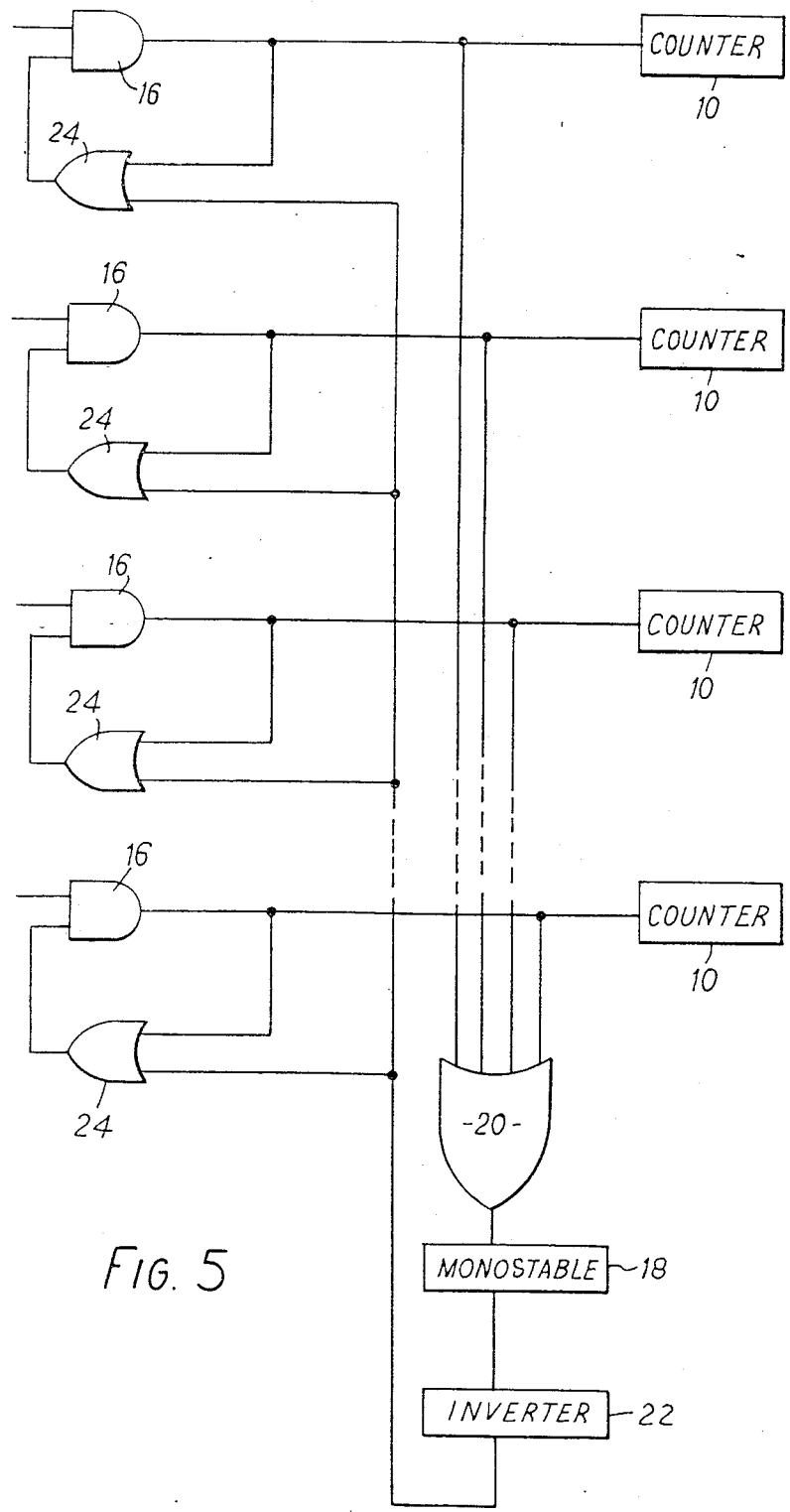
Figure 6:
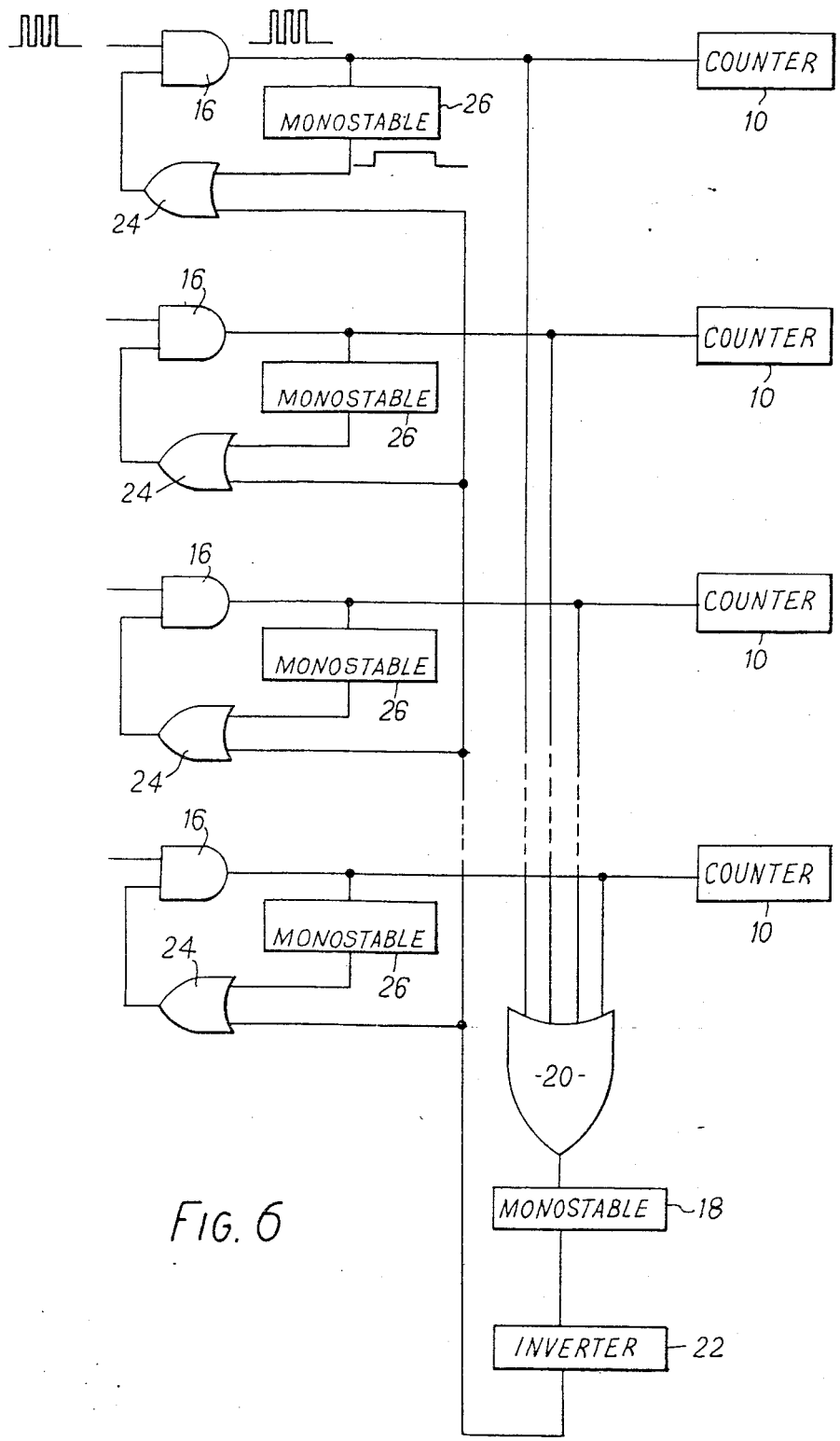

In the embodiments of FIGS. 5 and 6 a pulse of longer duration is supplied to the counters so as to avoid limitations on the apparatus which may be imposed by having to record pulses of short duration.

In FIG. 5 the arrangement is similar to FIG. 4 except that second OR gates 24 are provided having first inputs connected to the respective outputs of the AND gates and second inputs connected to the output of the inverter 22. In the quiescent state the first inputs to the AND gates 16 from the signal conditioners 6 are at logic level 0 as are the outputs of those gates and therefore the first inputs to the first OR gate 20. The logic level 0 thus also exist at the output of gate 20 and the inverter 22 therefore applies logic level 1 to the second inputs of the OR gates 24. Thus logic level 1 subsists at the outputs of OR gates 24 which are also the second inputs of AND gates 16. On switching of the level to logic level 1 of the first input of one of the AND gates, say the uppermost AND gate, OR gate 20 is actuated and its output logic level is switched to level 1 thus firing the monostable 18 causing for the duration of the monostable pulse the inverter to hold the second inputs of OR gates 24 at logic level 0. The OR gates 24 other than the uppermost gate thereof have their outputs switched to logic level 0 thereby preventing switching of the first inputs of the associated AND gates to logic level 1 from causing switching of the outputs of those AND gates to logic level 1. The uppermost OR gate 24 however remains in a condition where its first input from the uppermost signal conditioner keeps the first input to the uppermost AND gate at logic level 1. Thus the input pulse applied to any counter 10 has the same duration as the first input pulse of the pulse train, such as that of FIG. 2(b), received from the relevant signal conditioner 6 so that the timing of the counter input pulses is not dependent on the inherent switching characteristics of the circuit elements.

In FIG. 6, as compared with FIG. 5 a further retriggerable monostable 26 is interposed between the output of each AND gate 16 and the first input of the associated second OR gate 24. The duration of the pulse from monostable 26 is shorter than the pulse from monostables 18, for example, 10–200 microseconds for monostables 26 compared with 1–100 milliseconds for monostable 18. This as will become apparent enables logic gate 16 first receiving a signal from a signal conditioner to pass all the signal pulses of the particular emission signal whilst the other AND gates remain disabled. The counter associated with the enabled AND gate thus counts all the pulses of a particular emission received by one of the transducers which when processed in the appropriate pre-amplifier and amplifier of the succeeding conditioner exceed the threshold level. This form of counting has preference in certain applications over the form of counting of the other described embodiments where each emission at a transducer can give rise to only one increment being registered on the counter.

This embodiment operates as follows: in the quiescent state logic level 0 prevails at the first inputs of the AND gates 16 and at the outputs thereof so that there is logic level 0 at the output of OR gate 20 and the logic level 1 accordingly subsists at the second inputs of the OR gates 24 and therefore at the second inputs of AND gates 16. When the logic level at the first input to one, say the uppermost, of the AND gates switches to level 1 because the associated transducer is the first to receive an acoustic emission signal, the level at the output of that gate switches to logic level 1 causing initiation of operation of the associated counter 10, firing of the associated monostable 26 and actuation of OR gate 20. The output of gate 20 now switches to logic level 1 and monostable 18 is accordingly fired. This effects switching to 1 and 0 of the respective levels of the input and output of the inverter 22. All except the uppermost of the OR gates 24 are disabled by the switch to logic level 0 at the inverter output and in consequence the corresponding AND gates are disabled for the duration of the pulse of monostable 18. The switching to logic level 0 on firing of the monostable 18 does not, however, disable the OR gate 24 associated with the uppermost AND gate 16 because the output pulse from the monostable 26 at the first input of that OR gate holds, for the duration of that monostable pulse which is shorter than the pulse of monostable 18, that gate in the enabled condition. Thus changes in logic levels appearing, during the period of the pulse of monostable 26, at the first input of the corresponding gate 16 cause corresponding switchings of the output level of that gate which are recorded by the counter 10. Thus if the period of monostable 26 is chosen to be longer than the duration of the time interval separating consecutive pulses of a particular emission, all pulses in that emission which exceed when processed the threshold level 12 are recorded by the relevant counter 10.

The apparatus described in FIGS. 1 and 2 with the logic circuit means as in any one of the arrangements of FIGS. 3 to 6 is employed for the purposes of fault detection and location in a mechanical structure. Thus for example in a pressure vessel under test when say a welded joint is under examination the transducers are located at various positions along and spaced from the weld and the structure is stressed by being subjected to internal pressure. Where faults exist a rapid sequence of metallurgical events is likely to take place which gives rise to acoustic emissions recorded by the counters 10. Normally, a more significant fault in a structure will produce acoustic emissions in greater numbers than a fault of lesser significance. The counter which is observed to be scoring pulses most quickly indicates the transducers 2 closest to the most significant fault.

I claim:

1. Electrical circuit means for use in acoustic emission detecting and/or recording apparatus having a plurality of channels and transducers for detecting acoustic emissions from a source comprising:

signal conditioner means for converting analogue signals, representative of acoustic emissions received by a transducer, to digital form, each acoustic emission by virtue of its passage through the structure at the speed of sound arriving at the different transducers in a sequence which indicates the relative distances of the transducers from the source;

a plurality of logic gates each having a first and second input connection and an output connection, said first input connection being connected in a channel of the apparatus to a transducer by way of said signal conditioner means, the logic gate in each channel of the apparatus being set prior to receipt of a signal from the associated signal conditioner means to afford at its output connection an output signal upon receipt of said signal at said first input connection; an logic element means connected between said output and said second input connections of each of said logic gates for resetting, upon receipt of a digital signal by one of said logic gates at the first input connection thereof, the remainder of said logic gates to prevent the appearance of an output signal at any of said remainder of logic gates for a predetermined time which is short compared with the time interval between successive acoustic emissions from the source.

2. Electrical circuit means as claimed in claim 1, wherein said logic element means reset, upon receipt of a signal by one of said logic gates at the first input connection thereof, for a predetermined time all said logic gates so as to prevent the appearance of an output signal on any of said logic gates during said predetermined time.

3. Electrical circuit means as claimed in claim 2, wherein said logic gates comprise a plurality of AND gates each having a first input which in operation is connected to receive electrical signals from one of the transducers, a second input, and an output, and said logic element means comprise a plurality of monostables having an input and an output, said monostables being connected at their inputs respectively to the outputs of said AND gates and at their outputs, during operation, to the indicating and/or recording means, an OR gate having an output and inputs the latter connected to respective outputs of said monostables, and an inverter having an input connected to the output of said OR gate and an output connected to each of said second inputs of said AND gates.

4. Electrical circuit means as claimed in claim 2, wherein said logic gates comprise a plurality of AND gates each having a first input which in operation is connected to receive electrical signals from one of the transducers, a second input, and an output connected in operation to indicating and/or recording means, and said logic element means comprise an OR gate having an output and inputs, said inputs being connected to the outputs of said AND gates, a monostable having an output and an input, said input being connected to said OR gate output, and an inverter having an input connected to said monostable output and an output connected to each of said second inputs of said AND gates.

5. Electrical circuit means as claimed in claim 1, wherein said logic element means reset, upon receipt of a signal by one of said logic gates at the first input connection thereof, for a predetermined time only those logic gates other than said gate in receipt of said signal so as to prevent the appearance of an output signal thereon.

6. Electrical circuit means as claimed in claim 5, wherein said logic gates comprise a plurality of AND gates each having a first input which in operation is connected to receive electrical signals from one of the transducers, a second input and an output connected in operation to the indicating and/or recording means, and said logic element means comprise a first OR gate having an output and inputs, said inputs being connected to the respective outputs of said AND gates, a plurality of second OR gates having outputs respectively connected to said second inputs of said AND gates, first inputs respectively connected to said outputs of said AND gates and second inputs, a monostable for providing an output pulse having an input connected to said output of said first OR gate and an output, and an inverter having an input connected to said output of said monostable and an output connected to said second inputs of each of said second OR gates.

7. Electrical circuit means as claimed in claim 6, wherein in each connection between said output of said AND gate and said first input of said second OR gate a retriggerable monostable is interposed.

8. Electrical circuit means as claimed in claim 7, wherein each retriggerable monostable provides, when fired, an output pulse of duration less than the output pulse of said monostable connected between said first OR gate and said inverter.

9. Electrical circuit means as claimed in claim 8, wherein the duration of said output pulse of each retriggerable monostable exceeds the time interval between pulses within an acoustic emission comprising a train of oscillations.

* * * * *

UNITED STATES PATENT OFFICE
CERTIFICATE OF CORRECTION

Patent No. 3,822,586     Dated July 9, 1974

Inventor(s) POLLOCK

It is certified that error appears in the above-identified patent and that said Letters Patent are hereby corrected as shown below:

Column 4, between lines 42 and 43 insert --and its output are at logic level 1 so long as the input--.

Signed and sealed this 8th day of October 1974.

(SEAL)
Attest:

McCOY M. GIBSON JR.
Attesting Officer

C. MARSHALL DANN
Commissioner of Patents